United States Patent
Liu et al.

(10) Patent No.: US 6,803,735 B2
(45) Date of Patent: Oct. 12, 2004

(54) SPEED-BASED OPEN-LOOP START-UP METHOD FOR BRUSHLESS DC MOTOR

(75) Inventors: Ke Liu, Ontario (CA); John Makaran, Ontario (CA)

(73) Assignee: Siemens VDO Automotive Inc., Mississauga (CA)

( * ) Notice: Subject to any disclaimer, the term of this patent is extended or adjusted under 35 U.S.C. 154(b) by 154 days.

(21) Appl. No.: 10/261,700

(22) Filed: Oct. 1, 2002

(65) Prior Publication Data

US 2004/0061467 A1 Apr. 1, 2004

(51) Int. Cl.$^7$ .............................. H02P 1/04; H02P 5/00; H02P 1/46
(52) U.S. Cl. ........................ 318/463; 318/715; 318/721; 318/138; 318/85; 318/254; 318/439; 388/801; 388/826
(58) Field of Search .................................. 318/463, 465, 318/430, 431, 715, 721, 138, 85, 690–695, 254, 439, 705; 388/801, 806, 826, 911

(56) References Cited

U.S. PATENT DOCUMENTS

| | | | |
|---|---|---|---|
| 3,706,923 A | | 12/1972 | Dunfield |
| 4,447,771 A | | 5/1984 | Whiled |
| 4,455,513 A | | 6/1984 | Fulton et al. |
| 4,490,661 A | | 12/1984 | Brown et al. |
| 4,665,350 A | | 5/1987 | Angi et al. |
| 4,743,815 A | | 5/1988 | Gee et al. |
| 4,937,508 A | * | 6/1990 | Rozman ...................... 318/254 |
| 5,223,772 A | * | 6/1993 | Carobolante ................ 318/254 |
| 5,254,914 A | * | 10/1993 | Dunfield et al. ............ 318/254 |
| 5,349,275 A | | 9/1994 | Muller |
| 5,420,492 A | | 5/1995 | Sood et al. |
| 5,530,326 A | | 6/1996 | Galvin et al. |
| 5,541,488 A | | 7/1996 | Bansal et al. |
| 5,569,990 A | | 10/1996 | Dunfield |
| 5,592,058 A | * | 1/1997 | Archer et al. ................ 318/254 |
| 5,652,493 A | | 7/1997 | Hendershot, Jr. |
| 5,744,921 A | | 4/1998 | Makaran |
| 5,821,708 A | | 10/1998 | Williams et al. |
| 5,841,252 A | | 11/1998 | Dunfield |
| 5,905,348 A | * | 5/1999 | Nolan ......................... 318/254 |
| 6,034,493 A | | 3/2000 | Boyd et al. |
| 6,100,656 A | | 8/2000 | El-Sadi et al. |
| 6,107,763 A | * | 8/2000 | Rossi .......................... 318/254 |
| 6,229,274 B1 | | 5/2001 | Vertemara et al. |
| 6,249,095 B1 | | 6/2001 | Takura |
| 6,441,572 B2 | | 8/2002 | Batzel |
| 6,586,898 B2 | * | 7/2003 | King et al. .................. 318/254 |
| 2001/0030517 A1 | | 10/2001 | Batzel |
| 2002/0014870 A1 | | 2/2002 | Krotsch et al. |

OTHER PUBLICATIONS

1997 Power Transmission Design, "Adjustable–Speed Drives", pp. A39–A53.

* cited by examiner

Primary Examiner—David Martin
Assistant Examiner—Edgardo San Martin

(57) ABSTRACT

A method of starting a brushless DC motor 12 at any initial speed (A) establishes a initial stator-field speed and setting a counter of synchronization, (B) measures a speed of a rotor of the motor, (C) compares the speed of the rotor with the stator-field speed to determine if the rotor is synchronized with the stator-field. If the rotor is not synchronized with the stator-field, the method includes (a) re-setting the counter of synchronization, (b) increasing an acceleration portion of motor current ($I_{acc}$) to enhance torque, (c) setting the stator-field speed higher than the rotor speed, (d) calculating a period of an open-loop timer, (e) calculating a value for a load portion of the motor current ($I_{ld}$), where total motor current $I=I_{acc}+I_{ld}$, (f) performing commutation based on the open-loop timer and returning to step (B) until the rotor is synchronized with the stator-field. If synchronization of the rotor and stator-field is determined, the method includes incrementing the counter of synchronization, determining if the counter is greater than a certain value, and if the counter is greater than the certain value, switching from open-loop commutation to closed-loop commutation. If the counter is not greater than the certain value, the method includes proceeding to step (c).

10 Claims, 2 Drawing Sheets

SPEED-BASED OPEN-LOOP START-UP METHOD FOR BRUSHLESS DC MOTOR

FIELD OF THE INVENTION

The invention relates to brushless DC motors and, more particularly, to a start-up process to start a brushless DC motor at any initial speed.

BACKGROUND OF THE INVENTION

Brushless DC motors are also known as electronically-commutated DC motors wherein the commutation of the stator windings is performed based on the rotor position. Rotor position is essential for commutation in brushless DC motors. However, due to the high manufacturing cost, absolute position sensors to detect rotor position are not desired. To obtain the position information two methods are usually used: single-bit position sensor (optical or magnetic), or sensing the zero crossing points of the winding back EMF. A combination of these two methods is also used in some applications.

To start a brushless DC motor without an absolute position sensor a special start-up scheme is required. Two conventional start-up schemes are: (1) to brake the rotor to a known position and then start running the motor from that position, (2) or energizing the motor windings in a open-loop sequence to bring the motor up to at certain speed and then switch to closed-loop commutation.

In some applications the motor is rotating prior to a command from the control circuitry. Both of the above mentioned conventional start-up schemes have drawbacks in such applications. In the first scheme, the required braking torque is much larger if the rotor is already rotating. The stress on the power electronics is also greater. This is particularly true if the load is a high inertia fan. In the second scheme, a fixed stator-field speed may be too far away from the actual rotor speed and prevent a successful start-up.

Accordingly, there is a need to provide a method of starting a brushless DC motor at any initial speed.

SUMMARY OF THE INVENTION

An object of the invention is to fulfill the need referred to above. In accordance with the principles of the present invention, this objective is achieved by providing a method of starting a brushless DC motor at any initial speed. The method (A) establishes an initial stator-field speed and sets a counter of synchronization, (B) measures a speed of a rotor of the motor, (C) compares the speed of the rotor with the stator-field speed to determine if the rotor is synchronized with the stator-field. If the rotor is not synchronized with the stator-field, the method includes (a) re-setting the counter of synchronization, (b) increasing an acceleration portion of motor current ($I_{acc}$) to enhance torque, (c) setting the stator-field speed higher than the rotor speed, (d) calculating a period of an open-loop timer, (e) calculating a value for a load portion of the motor current ($I_{ld}$), where total motor current $I=I_{acc}+I_{ld}$, (f) performing commutation based on the open-loop timer and returning to step (B) until the rotor is synchronized with the stator-field. If synchronization of the rotor and stator-field is determined, the method includes incrementing the counter of synchronization, determining if the counter is greater than a certain value, and if the counter is greater than the certain value, switching from open-loop commutation to closed-loop commutation. If the counter is not greater than the certain value, the method includes proceeding to step (c).

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
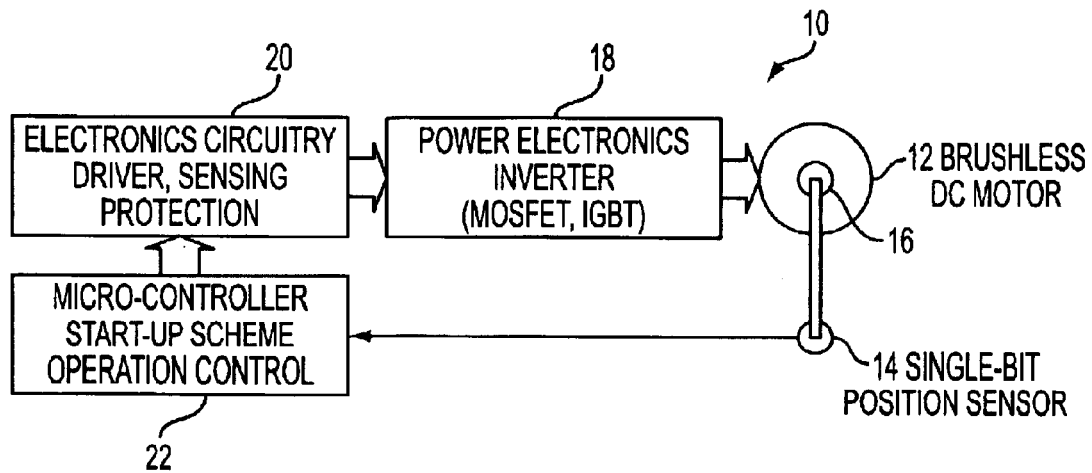
FIG. 1 is a block diagram of a brushless DC motor control system provided in accordance with the principles of the present invention.

With reference to FIG. 1, a brushless DC motor control system, provided in accordance with the invention, is shown generally indicated at 10. The system 10 includes a brushless DC motor 12 which can be 3-phase, 5 phase, etc. A single-bit position sensor 14 is operatively associated with a rotor 16 of the motor 12 to determine a speed of the rotor 16. The sensor 14 can be optical, magnetic or any type of sensor to sense rotor speed. A power electronics inverter 18 is associated with the motor 12. The inverter 18 is built of power electronics switching components, such as IGBT, MOSFET or other suitable switching components. Electronics control circuitry 20 is provided that includes driver circuitry for the power electronics inverter 18 and includes sensing and protection circuitry. The system 10 also includes a controller, such as a micro-controller 22, that executes software to control the operation of the motor 12 and the start-up method of the invention, as will be explained below.

Figure 2:
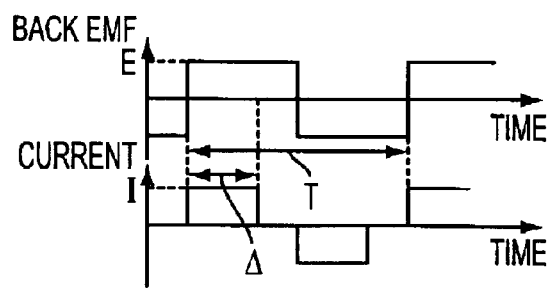
FIG. 2 is a waveform of a brushless DC motor operating in closed-loop commutation in accordance with the invention.
Figure 3:
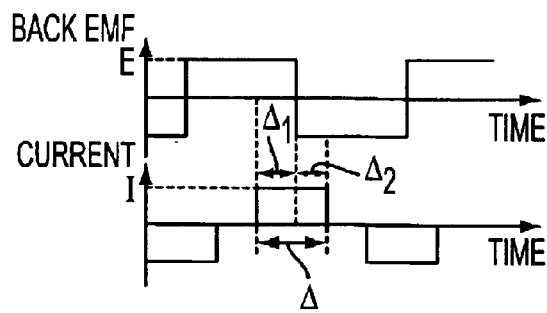
FIG. 3 is a waveform of a brushless DC motor operating in open-loop commutation in accordance with the invention.

To simplify the analysis in developing the inventive method, both the back EMF and the winding current waveforms were assumed to be square waves. This assumption is reasonable while discussing the operation principle of brushless DC motors. The waveforms during closed-loop and open-loop commutation are illustrated in FIGS. 2 and 3, respectively.

During closed-loop commutation (FIG. 2), the windings of the motor 12 are energized according to the signal from sensor 14 so that the winding current is positive when the back EMF is positive. The average torque of the motor can be calculated as $$\tau = m \cdot \frac{2\Delta}{T} \cdot \frac{EI}{\omega} \quad (1)$$

Where $\tau$ is the torque, m the number of phases, $\Delta$ the pulse width of the current, T the time period of back EMF, E the amplitude of back EMF, I the amplitude of current, and $\omega$ is the angular velocity.

During open-loop commutation (FIG. 3) the stator windings are energized in a rotating sequence that is determined based on an open-loop timer. The winding current does not start at the right position and only one part of the current ($\Delta_1$) builds up positive torque when the back EMF is positive, while the other part ($\Delta_2$) of the current produces negative torque (braking) as the back EMF is negative. The average torque is $$\tau = m \cdot \frac{2(\Delta_1 - \Delta_2)}{T} \cdot \frac{EI}{\omega} \quad (2)$$

From equations (1) and (2) it can be seen that to obtain the same torque, larger current is needed during open-loop commutation than during closed-loop commutation. During open-loop commutation the rotor will brake or accelerate based on the torque it obtains, therefore the rotor position ($\Delta_1$, $\Delta_2$) relating to the stator-field is adjusted. When synchronization between the rotor and stator-field is achieved, the rotor rotates at the same speed as the stator-field, and $\Delta_1$ and $\Delta_2$ become constant. At this time, commutation can switch from open-loop to closed-loop.

In the present open-loop start-up method, the open-loop speed of stator-field is determined by adding a small difference to the actual rotor speed. This speed-based arrangement has following advantages:

(a) The synchronization between the rotor and the stator field is easy to achieve. The speed difference between the rotor and stator-field is controlled and relatively small. Therefore, the rotor does not need to change speed greatly to match the stator field. On the other hand, the rotor needs to adjust its position relative to the stator field before synchronization can be achieved. The slight speed difference helps this adjustment.

(b) The process of synchronization is robust. At beginning of the start-up process, the rotor speed might decrease significantly due to the braking torque the rotor might obtain. This speed change will not lead to a failure of synchronization since the speed of stator-field is adjusted along with the rotor speed. During the process of synchronization, while the rotor is adjusting the relative position to the stator-field, oscillation might occur since the motor is a second order vibration system, and the torque might go above the equilibrium as the rotor catches up with the stator-field. However the speed-based open-loop process will help suppress the oscillation, since the higher stator-field speed always requires a forward (positive) torque allowing the rotor catch up. When the rotor reaches an equilibrium position (FIG. 3), the torque obtained during acceleration is usually larger than required at equilibrium, the rotor is forced to go further, and the time interval $\Delta_1$ becomes smaller, which causes the torque to decrease. Then the rotor will slow down and stay at the equilibrium position.

(c) The electric stress on power electronics components is significantly reduced. Since the speed difference is small, the torque required for changing the rotor speed is relatively small, and so is the motor current. Other open-loop or braking start-up processes have a large speed difference between rotor and stator-fields. Here the torque required to change the rotor speed is relatively large, and so is the motor current. The electric stress on the power electronics components is reduced significantly in the disclosed start-up method process.

Another feature of the disclosed start-up method is current control. From the equation (2) the optimal and worst working points can be derived as:

The optimal working point $\Delta_1 = \Delta$, $\Delta_2 = 0$. The motor current creates only positive torque as during closed-loop commutation.

The worst working point $\Delta_1 = \Delta_2$, $\Delta_1 - \Delta_2 = 0$. The motor current does not produce any torque, only losses.

During open-loop commutation the working point is usually somewhere between these two points. The purpose of the current control is to achieve a working point away from the worst point, but as close to the optimal point as possible. It can be appreciated that the optimal working point cannot be permanently achieved without the information of rotor position (closed-loop).

Regarding the mechanical system, the torque required to let the rotor catch up with stator-field is $$\tau = \tau_{ld} + J\frac{d\omega}{dt} \quad (3)$$

Where $\tau$ is the torque of motor, $\tau_{ld}$ the torque of load, J the inertia of the system, $\omega$ the angular velocity, and t is the time.

The load torque is usually a function of the speed. e.g. it is proportional to the speed if the load is a fan. The second part at the right side of equation (3) represents the torque for acceleration, which determines how fast the rotor can synchronize with the stator-field.

Since the torque is proportional to the current, the motor current can be derived from equation (3) as:

$$I = I_{ld} + I_{acc} \quad (4)$$

Where I is the total motor current, $I_{ld}$ the portion of current that compensates for the torque of the load, and $I_{acc}$ is the portion of current that produces the accelerating torque.

According to the equation (4) the reference value for current control consists of two portions:

$I_{ld}$: which is set based on the load type and the speed, $I_{acc}$: which is set based on the effect of synchronization.

The current control keeps the motor current slightly larger than required during closed-loop commutation. Therefore, the torque is large enough to achieve synchronization, and the electric stress on the power electronics components is kept to a minimum.

Figure 4:
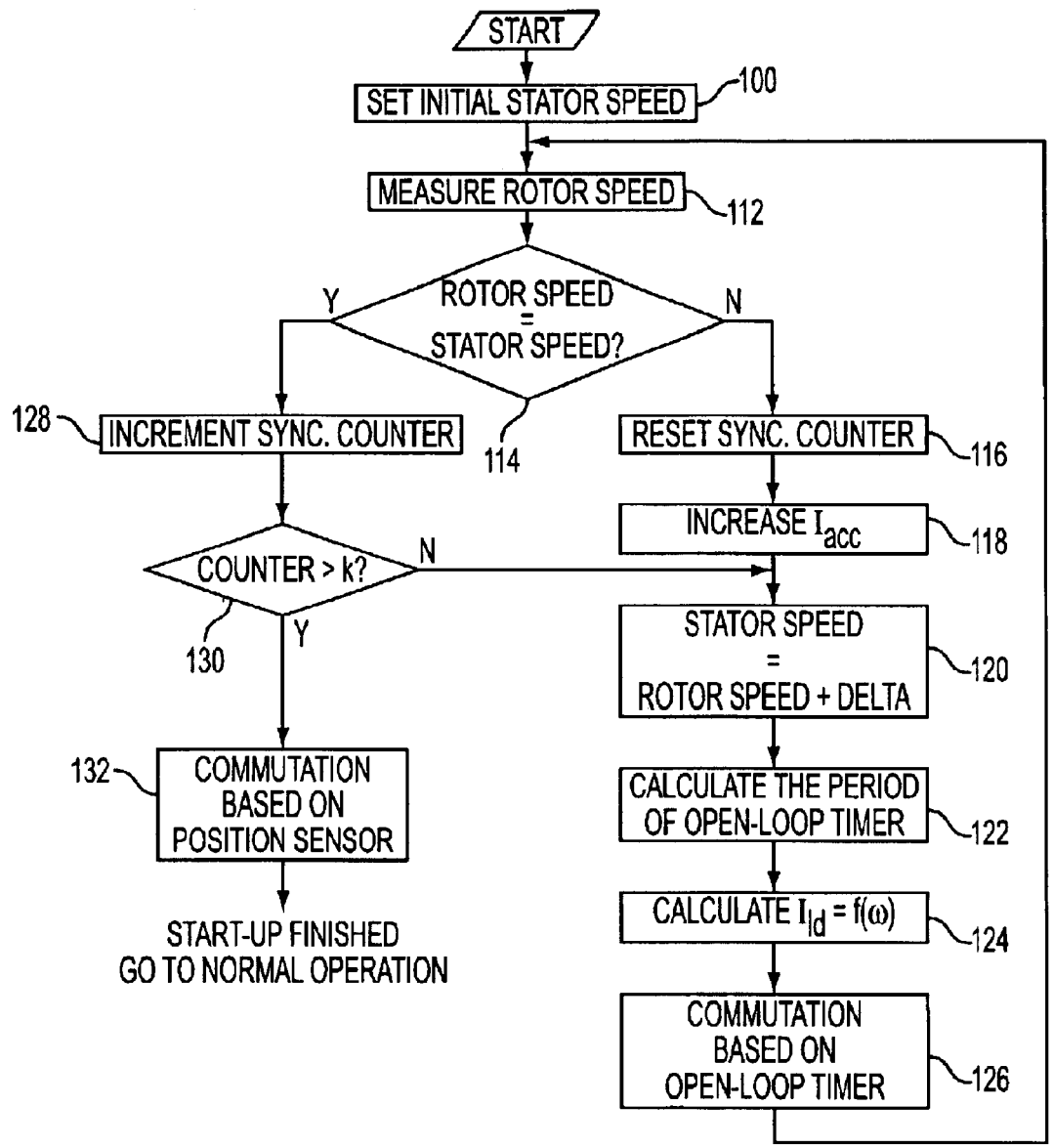
FIG. 4 is flowchart indicating control of a brushless DC motor at start-up in accordance with the invention.

FIG. 4 shows a flow chart of the speed-based open-loop start-up method of the invention. Before the motor is started, an initial stator-field speed is set at step 100 and a counter of synchronization is set. In step 112, the rotor speed is measured by counting the number of pulses of the single-bit position sensor 14 within a certain period of time. In step 114, the rotor speed is compared with the stator-field speed to check if the rotor has become synchronized with the stator-field. If the rotor is not synchronized with the stator-field the following must be performed:

in step 116, the counter of synchronization is reset, in step 118, the accelerating portion of motor current ($I_{acc}$) is increased to enhance the torque, in step 120 the stator-field speed is set slightly higher than the rotor speed, the period of the open-loop timer is calculated in step 122, the reference value for the load portion of motor current ($I_{ld}$) is calculated in step 124, in step 126, commutation is performed based on the open-loop timer, and after step 126, the method returns to step 112.

If the synchronization of the rotor and stator-field is detected in step 114, the counter of synchronization is incremented in step 128. If the counter is less than a certain valve k in step 130, the method proceeds to step 120. If the counter is greater than the certain value k, the open-loop start-up process is stopped. In step 132, closed-loop commutation begins at the rising edge of the position signal from sensor 14 and normal operation starts.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of starting a brushless DC motor at any initial speed, the method including:
   (A) establishing an initial stator-field speed and setting a counter of synchronization,
   (B) measuring a speed of a rotor of the motor,
   (C) comparing the speed of the rotor with the stator-field speed to determine if the rotor is synchronized with the stator-field,
   if the rotor is not synchronized with the stator-field, the method including:
     (a) re-setting the counter of synchronization,
     (b) increasing an acceleration portion of motor current ($I_{acc}$) to enhance torque,
     (c) setting the stator-field speed higher than the rotor speed,
     (d) calculating the period of an open-loop timer,
     (e) calculating a value for a load portion of the motor current ($I_{ld}$), where total motor current $I=I_{acc}+I_{ld}$,
     (f) performing commutation based on the open-loop timer and returning to step (B) until the rotor is synchronized with the stator-field,
   if synchronization of the rotor and stator-field is determined, the method including:
     incrementing the counter of synchronization,
     determining if the counter is greater than a certain value, and if the counter is greater than the certain value, switching from open-loop commutation to closed-loop commutation, and if the counter is not greater than the certain value, proceeding to step (c).

2. The method of claim 1, wherein the step of measuring the rotor speed includes counting a number of pulses of a single-bit position sensor, associated with the rotor, within a certain period of time.

3. The method of claim 2, wherein the position sensor is one of an optical and magnetic sensor.

4. The method of claim 2, wherein the method includes starting closed-loop commutation at a rising edge of a position signal of the position sensor.

5. The method of claim 1, wherein the motor is one of a three phase and five phase motor.

6. A method of starting a brushless DC motor at any initial speed, the method including:
   (A) establishing an initial stator-field speed and setting a counter,
   (B) measuring a speed of a rotor of the motor,
   (C) comparing the speed of the rotor with the stator-field speed to determine if the rotor is synchronized with the stator-field,
   if the rotor is not synchronized with the stator-field, resetting the counter and calculating a period of an open-loop timer and performing commutation based on the open-loop timer and returning to step (B) until the rotor is synchronized with the stator-field, and
   if synchronization of the rotor and stator-field is determined, incrementing the counter and determining if the counter is greater than a certain value and if the counter is greater than the certain value, switching from open-loop commutation to closed-loop commutation.

7. The method of claim 6, wherein the step of measuring the rotor speed includes counting a number of pulses of a single-bit position sensor, associated with the rotor, within a certain period of time.

8. The method of claim 7, wherein the method includes starting closed-loop commutation at a rising edge of a position signal of the position sensor.

9. The method of claim 7, wherein the position sensor is one of an optical and magnetic sensor.

10. The method of claim 6, wherein the motor is one of a three phase and five phase motor.

* * * * *